(12) United States Patent
Flinsenberg et al.

(10) Patent No.: US 10,237,950 B2
(45) Date of Patent: Mar. 19, 2019

(54) ADAPTIVE OUTDOOR LIGHTING CONTROL SYSTEM BASED ON USER BEHAVIOR

(71) Applicant: PHILIPS LIGHTING HOLDING B.V., Eindhoven (NL)

(72) Inventors: Ingrid Christian Maria Flinsenberg, Eindhoven (NL); Alexandre Georgievich Sinitsyn, Eindhoven (NL); Leszek Holenderski, Eindhoven (NL); Yuan Shu, Shanghai (CN); Yi Qiang Yu, Shanghai (CN)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 11 days.

(21) Appl. No.: 14/784,406

(22) PCT Filed: Apr. 17, 2014

(86) PCT No.: PCT/IB2014/060796
§ 371 (c)(1),
(2) Date: Oct. 14, 2015

(87) PCT Pub. No.: WO2014/174412
PCT Pub. Date: Oct. 30, 2014

(65) Prior Publication Data
US 2016/0150622 A1    May 26, 2016

Related U.S. Application Data

(60) Provisional application No. 61/815,981, filed on Apr. 25, 2013.

(51) Int. Cl.
H05B 37/02    (2006.01)

(52) U.S. Cl.
CPC ..... *H05B 37/0227* (2013.01); *H05B 37/0245* (2013.01); *H05B 37/0272* (2013.01)

(58) Field of Classification Search
CPC ............ H05B 37/0227; H05B 37/0272; H05B 37/0281; H05B 33/0854; H05B 41/36;
(Continued)

(56) References Cited

U.S. PATENT DOCUMENTS

| 5,886,738 A | 3/1999 | Hollenbeck et al. |
| 2003/0189499 A1* | 10/2003 | Stricklin ............ G08G 1/0175 340/933 |

(Continued)

FOREIGN PATENT DOCUMENTS

| EP | 2398301 A1 | 12/2011 |
| EP | 2466995 A1 | 6/2012 |

(Continued)

OTHER PUBLICATIONS

Paravati, Gianluca et al "An Immersive Visualization Framework for Monitoring, Simulating and Controlling Smart Street Lighting Networks", SIMUTOOLS 2012.

*Primary Examiner* — Seokjin Kim

(57) ABSTRACT

The invention provides A light management system for an outdoor lighting network system, comprising a plurality of outdoor light units wherein at least one light unit includes at least one sensor type, a central management system in communication with light units, said central management system sends control commands to one or more of said outdoor light units, in response to received outdoor light unit status/sensor information from one or more of said outdoor light units and implement a lighting strategy relating to the lighting characteristics of the plurality of outdoor light units, wherein the central management system uses the light unit status/sensor information to form a user's behavior analyses, and determine or estimate or predict the user's motion (Continued)

trajectory and/or position and a change in a user-controlled light use and/or ambient light, and determine whether to modify the lighting strategy and/or reconfigure one or more of the lights units.

16 Claims, 3 Drawing Sheets

(58) Field of Classification Search
CPC .............. H05B 37/0263; H05B 37/028; H05B 33/0863; H05B 37/02; Y02B 20/48; Y02B 20/42; Y02B 20/72; Y02B 20/40; Y02B 20/383; B60Q 1/04; B60Q 1/1423; B60Q 1/085; B60Q 2300/054; B60Q 2300/112; B60Q 2300/116; B60Q 2300/122; B60Q 2300/134; B60Q 2300/142; B60Q 2300/314; B60Q 2300/322; B60Q 2300/41; B60Q 2300/42; F21S 4/28; F21S 48/115; F21S 48/1747; F21S 48/10; F21K 9/13; F21V 29/20; F21V 29/402; F21V 23/0435; F21V 29/677; F21V 21/02; F21W 2101/10; F21W 2111/023; F21W 2111/027; F21W 2111/08; F21W 2131/103; F21W 2131/40; F21Y 2101/02; F21Y 2113/00

See application file for complete search history.

(56) References Cited

U.S. PATENT DOCUMENTS

| | | |
|---|---|---|
| 2003/0218537 A1 | 11/2003 | Hoch |
| 2004/0105264 A1 | 6/2004 | Spero |
| 2009/0009089 A1 | 1/2009 | Burkett |
| 2010/0052571 A1 | 3/2010 | Murakami |
| 2010/0320917 A1 | 12/2010 | Tsou |
| 2011/0001626 A1 | 1/2011 | Yip |
| 2012/0038281 A1 | 2/2012 | Verfuerth |
| 2012/0206051 A1 | 8/2012 | Nieuwlands |
| 2012/0319597 A1 | 12/2012 | Park |
| 2014/0001961 A1* | 1/2014 | Anderson .......... H05B 37/0227 315/153 |
| 2015/0319825 A1* | 11/2015 | Destine .............. H05B 37/0227 315/153 |

FOREIGN PATENT DOCUMENTS

| | | |
|---|---|---|
| JP | 0492395 A | 3/1992 |
| JP | 0696865 A | 4/1994 |
| JP | 2005134941 A | 5/2005 |
| WO | 2009003279 A1 | 1/2009 |
| WO | 2012061709 A1 | 5/2012 |
| WO | 2012090142 A2 | 7/2012 |
| WO | 2013054221 A1 | 4/2013 |

* cited by examiner

ADAPTIVE OUTDOOR LIGHTING CONTROL SYSTEM BASED ON USER BEHAVIOR

CROSS-REFERENCE TO PRIOR APPLICATIONS

This application is the U.S. National Phase application under 35 U.S.C. § 371 of International Application No. PCT/IB2014/060796, filed on Apr. 17, 2014, which claims the benefit of U.S. Provisional Patent Application No. 61/815,981, filed on Apr. 25, 2013. These applications are hereby incorporated by reference herein.

The present invention is directed generally to lighting control/management of outdoor lighting networks (OLNs) as well as information management using an outdoor lighting network. More particularly, various inventive methods and apparatus disclosed herein relate to integrated control of an outdoor lighting network for integrating illumination based on a user's behavior analysis, wherein the behavior analysis includes determining a user/vehicle motion trajectory/estimated position, speed and ambient light level and/or a change thereto, as well as methods for using the foregoing. The lighting network includes an array of outdoor light units, and a network apparatus, hardware, and software for monitoring and managing the array, and/or analyzing sensor information gathered from the array for targeted lighting control.

Systems have been introduced for the management of an outdoor lighting network (OLN). For example, lighting units of an OLN may be remotely managed to provide control over lighting behavior (e.g., scheduling of the on/off times of the lighting units and/or setting dimming levels of the lighting units). Management of outdoor lighting networks may provide one or more benefits to customers (e.g., municipalities) such as energy savings, reduced maintenance costs, and/or reduced lighting pollution, etc.

One problem in such systems is providing a lighting solution is to find the balance between comfort, safety/productivity and cost. The best foreseeable lighting solution in terms of comfort and/or safety provides as much light as needed 24 hours 7 day a week. In that situation the light is always on when needed, and safety/comfort is at its best. However, the energy cost of that solution is considerable; hence efforts are taken to reduce the energy consumption while maintaining a satisfactory comfort/safety level, for example by using a camera to measure traffic volume and speed. The introduction of sensors to control the lighting reduces safety/comfort when the sensor readings or predicted car locations are incorrect and the light is turned off while people are still on the road. In the current strive for ever lower energy consumption, the lighting control becomes increasingly intelligent, increasing the risk for comfort/safety loss, and increasing the need for measuring the comfort/safety level of the current lighting solution.

The present disclosure is directed to inventive methods and apparatus for management and control of outdoor lighting networks. The invention is a system comprising an outdoor lighting network (OLN) including an array of outdoor light units, sensors and/or other integrated or connected electrical devices (hereinafter referred to as "light units"), a central management system (CMS), a wired/wireless network, including software, firmware, for monitoring and managing the OLN, as well as information management via the OLN. The OLN comprises multiple outdoor light units that may operate mainly in an independent mode where dimming, sensing, communication, and control processes take place between the various light units. Further communication and control may be provided between the light units and a CMS, event reporting (e.g. traffic, road hazards, etc.). The system may be tied to the Internet for dissemination of data and/or data analysis gathered by means of multiple light units or the dissemination of data through the light units to users by means of elements integrated into the light units or communication messages transmitted/received with users via user devices, for example smart phones.

The central management system (CMS) is operable to: receive and process light unit information, in particular, sensor unit data, determine a lighting strategy (e.g. lighting characteristic's, dimming/illumination requirements using a user's behavior analyses, for example by determining the amount of user-controlled light use (e.g. high or low beams in a car or flashlight), ambient light levels or changes thereto, an object's motion/speed and trajectory); determine/update the lighting strategy, e.g. the luminance model; coordinate the operation of the identified lighting units as a function of the lighting strategy, and send operation instructions to the plurality of lighting control apparatus to direct the identified light units to operate in accordance with the operation.

Another aspect of the invention provides a light unit in the OLN connected to a CMS, the light unit includes a processor; a memory operably connected to the processor; a sensing unit, and a communication module operably connected to the processor for communication with the CMS and other lighting units. The sensor can be any sensor for sensing any environmental condition. The processor is operable to: receive sensing data and determine various conditions including traffic, vehicle speed, ambient lighting conditions, etc. with or without the CMS; transmit the sensor data through the communication module to the CMS; receive an operation instruction for operation of the light unit through the communication module from the CMS; and direct the light unit to operate in accordance with the operation instruction.

One embodiment of the invention provides a light management system for an outdoor lighting network system having a plurality of outdoor light units each including at least one sensor type, where each of the light units communicates with at least one other light unit, at least one user input/output device in communication with at one or more of said outdoor light units, a central management system in communication with light units, said central management system sends control commands to one or more of said outdoor light units, one sensor type measures the speed of vehicles in the sensor range and another sensor type measures the ambient light level in the sensor range. The speed of the vehicles and ambient light level at each light unit is measured and/or changes in speed or ambient light level (e.g. from previous light unit sensor data). These are used to adapt the light characteristics (e.g. dimming) at subsequent light unit(s) according to the estimated position or trajectory of the users/vehicles. By using the accurate data of each light unit, the system is increasingly dynamic, and energy efficient. However, this also introduces the risk of dimming the light too much. To find the balance between energy saving due to dimming the lights and driver comfort/safety, we observe the driver behavior with the light and speed sensors available at each light unit. Using this observed driver behavior, the system can automatically optimize its control to ensure safety while optimizing energy savings.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well-known devices, circuits, tools, techniques, and methods are omitted so as not to obscure the description of the present system. It should be expressly understood that the drawings are included for illustrative purposes and do not represent the scope of the present system. In the accompanying drawings, like reference numbers in different drawings may designate similar elements. Also, the drawing figures are not necessarily to scale, emphasis instead generally being placed upon illustrating the principles of the invention.

Figure 1:
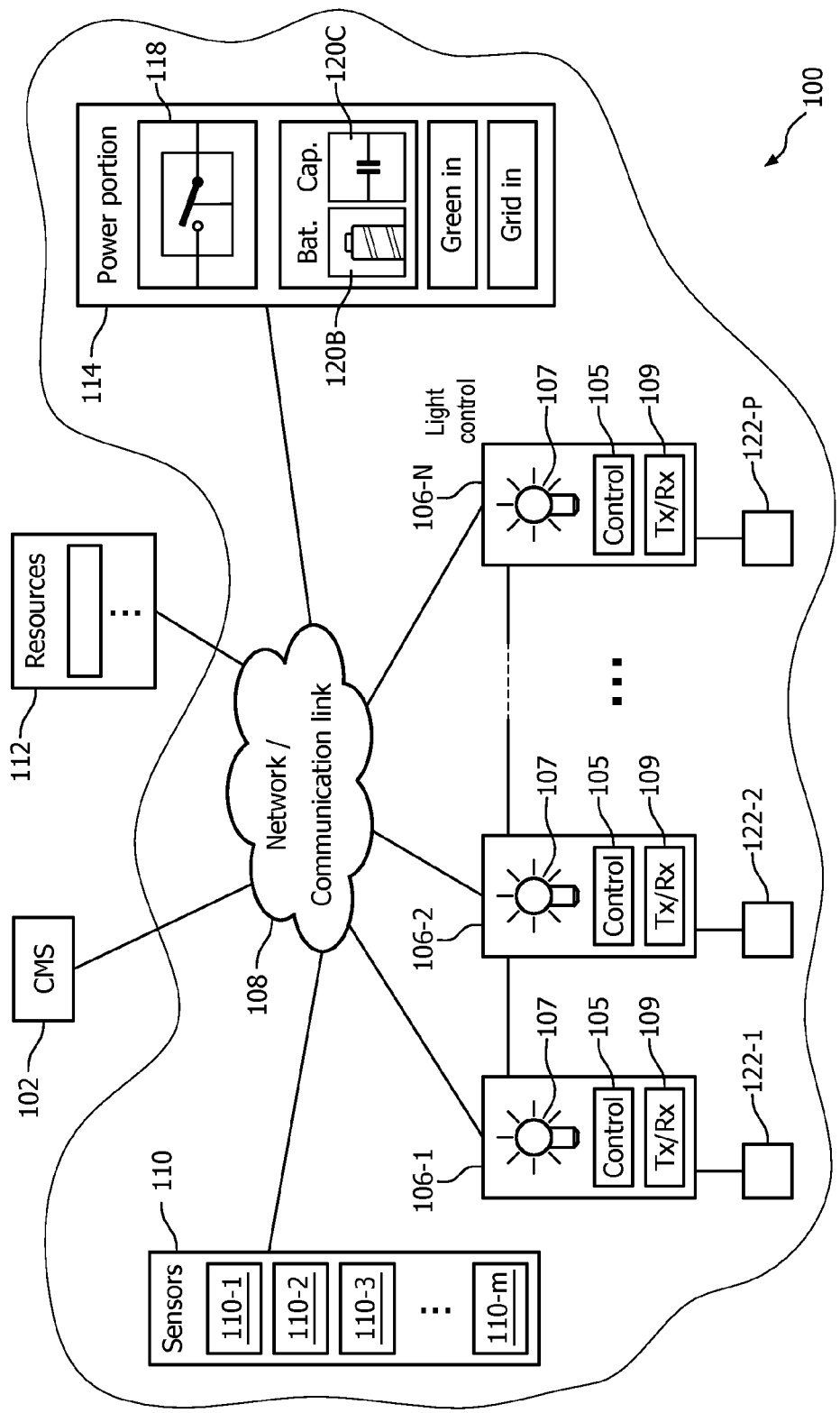
FIG. 1 is a schematic view of an outdoor lighting network (OLN) in accordance with embodiments of the present system.

It should also be understood that the sensors of the sensing unit can be any sensor for sensing any environmental condition, ranging from any electromagnetic signals to acoustic signals to biological or chemical signals to other signals. Examples include an IR detector, a camera, a motion detector, an ozone detector, a carbon monoxide detector, other chemical detectors, a proximity detector, a photovoltaic sensor, a photoconductive sensor, a photodiode, a phototransistor, a photo emissive sensor, a photo electromagnetic sensor, a microwave receiver, a UV sensor, a magnetic sensor, a magneto resistive sensor, and a position sensor.

Embodiments of the present system may interface with conventional lighting infrastructures such as urban walkway, street, and/or highway lighting systems to control one or more portions of conventional lighting systems. Further, embodiments of the present system may incorporate automatic information retrieval for weather, traffic detection techniques, public safety/security information to determine one or more lighting strategies/settings and/or to control and/or configure lighting systems in accordance with the determined one or more lighting strategies/settings. Embodiments of the present system may obtain traffic/weather/road/public safety/security related information such as past and/or current conditions and/or forecasts, via any suitable network or networks (e.g., the Internet, a telephony network, a wide area network (WAN), a local area network (LAN), a proprietary network, a wireless fidelity (WiFi™) network, a Bluetooth™ network, a peer-to-peer (P2P) network, etc.) and determine one or more lighting settings or system configurations in accordance with the past, current, and/or future conditions. Further, the one or more determined system or lighting settings or related information may be based at least in part upon sensor information obtained from sensors of the system such as optical sensors (e.g., image capture devices such as cameras, etc.), radar-based (e.g., Doppler effect) sensors, rain sensors (resistance based, etc.), location sensors (e.g., GPS, predetermined, etc.), temperature sensors (e.g., thermocouples, infrared (IR), bimetallic, mercury, etc.), etc., which may be located in one or more locations such as light units, light units, etc., in accordance with embodiments of the present system. For example, one or more sensors may be incorporated into outdoor light units and may provide sensor information to the system using any suitable communication method. Although only a limited number of sensors are shown for example in FIGS. 1& 2, other sensors are also envisioned such as satellite image sensors which may provide images of geography, atmospheric temperature, cloud cover, precipitation, etc.

In accordance with embodiments of the present system, a lighting system obtains various sensor information such as traffic, ambient lighting, etc., which is processed to determine particular lighting conditions in the vicinity of a corresponding sensor at one or more times or periods. For example, the sensors may be used to collected data in public spaces, such as retail stores, convention halls, public streets, sports venues, entertainment spots, etc., to monitor the flow of people, vehicles, or other objects, the speed at which the people or objects pass the unit, or any other suitable measurement. Thus, an illumination and/or power setting for selected light units are determined in accordance with the determined conditions and/or lighting conditions. In accordance with embodiments of the present system there is provided a control system which may set an illumination configuration of a first light unit in accordance with sensory information received from a second light unit. The system may set an illumination configuration including one or more of an illumination pattern (e.g., a shape of an illuminated area), illumination intensity (e.g., brightness), illumination spectrum (e.g., color), illumination polarization, illumination frequency, etc., of the first light unit in accordance with the sensor information received from the second light unit.

FIG. 1 is a schematic view of an outdoor lighting network (OLN) 100, a central management system (CMS) 102 and an information resources server 112 (e.g. weather, traffic, public safety/security reports or other, for example news media or Internet available information), in accordance with embodiments of the present system. Although FIG. 1 shows the elements of the outdoor lighting network (OLN) 100 as discrete elements, it is noted that two or more of the elements may be integrated into one device. The outdoor lighting network (OLN) 100 includes a plurality of light units or luminaires (and/or electrical devices) 106-1 through 106-N (generally 106-N), a plurality of sensors 110-1 through 110-M (generally 110), a power portion 114, one or more optional user interface apparatus 122-1 through 122-N (generally 122) and a network/communication link 108 which, in accordance with embodiments of the present system, may operably couple two or more of the elements of the present system.

The user interface apparatus 122-1 through 122-N is accessible to the user and can be used to send/receive information from the system 100. The user interface apparatus 122-1 through 122-N can be implemented as a dedicated device or incorporated in another device. The user interface apparatus 122-1 through 122-N can be implemented in a mobile phone, PDA, computer (e.g., laptop, tablet such as an iPad), vehicles including a car, airplane, helicopter, boat, or the like, device in a vehicle, mobile GPS device, embedded device, any intelligent device/machine, a sensing device or any other device accessible to a user.

The user interface apparatus 122-1 through 122-N communicates with the OLN, using any desired technology, such as a cellular data communication protocol (e.g., GSM, CDMA, GPRS, EDGE, 3G, LTE, WiMAX,), DSRC or WiFi radio, ZigBee protocol operating on top of the IEEE 802.15.4 wireless standard, WiFi protocol under IEEE standard 802.11 (such as 802.11b/g/n), Bluetooth protocol, Bluetooth Low Energy protocol, or the like.

The user interface apparatus 122-1 through 122-N also enables a user to receive available services of the OLN and/or the availability of an OLN service at any given location and time. The user interface apparatus 122-1 through 122-N can be any type of apparatus receiving/transmitting user.

The CMS 102 may include one or more processors which may control the overall operation of the outdoor lighting network (OLN) 100. The CMS 102 may also be "distributed" (e.g. de-centralized in-network processing or hierarchical system, for example, the StarSense system where each segment controller controls a sub-set of light poles). Accordingly, the CMS 102 may communicate with, the light units 106, the sensors 110, the power portion 114, and/or the resources server 112 to send (e.g., transmit) and/or receive various information in accordance with embodiments of the present system. For example, the CMS 102 receives sensor information from one or more of the sensors 110 and/or other information from the resources server 112.

For example, the system measures the speed of passing vehicles/users, and the respective ambient light level. This information is processed to determine lighting control settings (e.g., a lighting strategy) for one or more of the light units 106. Moreover, the speed of the vehicles at each light unit are measured and used to adapt the dimming levels at subsequent light units(s) according to the constantly updated estimated position of the vehicles.

When the CMS 102 has determined the lighting strategy (i.e. dimming), it executes this lighting strategy and then continues to monitor the speed of the respective vehicles/user and ambient light levels or changes thereto. If the users/vehicles on the road experience a light level that is too low, they will most likely switch to high beam in the vehicle or larger car lights, and/or reduce their speed. By detecting this change in a vehicle/user behavior (e.g. decrease in speed and/or increase in ambient light level) using the sensors in each light unit 106, the CMS 102 can automatically determine the comfort level or safety of the user/driver. In particular the system monitors if the behavior of the user/vehicle changes after executing the lighting strategy. The system stores this data in a memory (not shown) along with a flag indicating if a change in behavior has been detected.

The memory in the OLN and CMS may include any suitable non-transitory memory and is used to store information used by the system such as information related to operating code, applications, settings, history, user information, account information, weather related information, system configuration information, calculations based thereon, etc. The memory may include one or more memories which may be located locally or remote from each other (e.g., a surface area network (SAN).

As noted above, the CMS 102 stores information in the memory (e.g., historical information) which it receives and/or generates for further use such as to determine lighting characteristics in accordance with embodiments of the present system. In particular, the system stores: an indicator for behavior change (e.g. yes/no, no/reduce speed/increase lights/both), dimming schedule (list of pairs with <percentage, distance ahead of car>), original vehicle speed, original ambient level, and other parameters, e.g. road type, traffic volume, weather status . . . . As new information is received by the CMS 102, the stored information may then be updated by the CMS 102. The CMS 102 may include a plurality of processors which may be located locally or remotely from each other and may communicate with each other via the network 108.

Based on the information regarding behavior change stored in the memory upon different lighting strategies, the CMS 102 can optimize the determined dimming schedules. In particular, the CMS 102 tries to find the lighting strategy with largest dimming values (i.e. lowest energy usage) and lowest behavior change effects. Using the information stored in the memory and/or sensor data; this can be done using local search algorithms, or optimization methods. For example, a multi-parameter optimization may be used, or a city operator may select a weighing factor of the energy savings relative to the behavior change effects.

Next to observing a decrease in speed and/or increase in ambient light level, the system can also monitor other strange behavior. For example, the observed speed can be used to deduce racing/speeding or driving very slowly, or aggressive driving/driving close to another vehicle (by observing two cars very close together). Using other sensors, e.g. a camera, also other behaviors can be monitored such as ignoring traffic lights, road signs or warnings from passengers, weaving/swerving, getting off the road, and unnecessarily staying in an overtaking lane. A user's behavior patterns can be determined by monitoring the user's actions, as noted above, and comparing the actions to a predetermined threshold or norm. For example, stopping at red traffic lights or stop signs is a norm.

The system can also provide feedback to the other users upon observing a behavior change using the user interface apparatus 122, or the system can, for example, change the lighting characteristics of the light units 106, e.g. blinking or changing the light intensity at the location of the user that changed their behavior. It is also possible to send warnings to an outside system using the resources server 112, e.g. police.

The network 108 may include one or more networks and may enable communication between one or more of the CMS 102, the resources server 112, the light units 106, the sensors 110, and/or the power portion 114, using any suitable transmission scheme such as a wired and/or wireless communication schemes. Accordingly, the network 108 may include one or more networks such as a wide area network (WAN), a local area network (LAN), a telephony network, (e.g., 3G, a 4G, etc., code division multiple access (CDMA), global system for mobile (GSM) network, a plain old telephone service (POTs) network), a peer-to-peer (P2P) network, a wireless fidelity (WiFi™) network, a Bluetooth™ network, a proprietary network, the Internet, etc.

The resources server 112 may include other related information resources such as proprietary and/or third party news media and Internet related resources which may provide information such as public safety, security, regulatory, traffic, weather, road condition reports and/or forecasts to the CMS 102 and/or the light units 106. Further, the resources server 112 may include report applications to process information which may be sent to the resources server 112 such as the sensor information and/or reports and provide corresponding forecast information. Thus, the report applications may further refine a report for an area and/or time period using sensor information obtained by sensors such as the sensors 110.

The sensors 110 may include a plurality of sensors types such as sensors 110-1 through 110-M (generally 110) which may generate sensor information based on the particular sensor type such as image information, status information (e.g., light unit operative, non-operative, etc.), radar information (e.g., Doppler information, etc.), geophysical information (e.g., geophysical coordinates obtained from, for example, a global positioning system (GPS)), pressure information, humidity information, etc. The sensors 110-x may be located at one or more geophysical locations or integrated into a light unit 106-N, and may report their location to the CMS 102. Each sensor 110 may include a network address or other address which may be utilized to identify the sensor.

The light units 106 may include one or more of a transmission/reception (Tx/Rx) portion 109, a controller 105, illumination sources 107 such as lamps (e.g., a gas lamp, etc.), light emitting diodes (LEDs), incandescent lamps, fluorescent lamps, etc., and may be controlled by the controller 105. The controller 105 also manages the flow of information to and from the user interface apparatus 122-N in the light unit 106-N. The illumination sources may be configured in a matrix (e.g., a 10×10 matrix of illumination sources) in which illumination characteristics such as illumination pattern, intensity, spectrum (e.g., hue, color, etc.), polarization, frequency, etc., from one or more of the plurality of illumination sources and/or light pattern for a plurality of illumination sources, may be actively controlled by the system. The light units 106 may further include one or more light controlling elements 105 such as active reflector arrays to actively control illumination patterns from one or more of illumination sources of the plurality of illumination sources. For example, the one or more active reflector arrays may be electronically positioned and/or otherwise manipulated to provide (e.g., via reflection, refraction, and/or transmittance) illumination from one or more illumination sources into a desired area thus controlling an illumination pattern (e.g., controlling the shape and/or size of the illumination pattern such as is described with reference to 231-N below). Further, the one or more active reflector arrays may be electronically controlled to control an illumination intensity (e.g., in lumens) or color temperature of an illumination pattern as will be described below. Moreover, the light controlling elements 130 may include one or more active filters which may be controlled to control illumination transmission there through (e.g., via transmittance), illumination spectrum, and/or illumination polarization of illumination passing there through. Further, the controller may control illumination spectrum and/or light output (e.g., in Lm/M2) by one or more of the illumination sources. Thus, the controller may control illumination intensity by controlling the illumination output from an illumination source. Similarly, the controller may control two or more illumination sources to control an illumination pattern.

Thus, illumination characteristics such as illumination pattern, illumination intensity, illumination spectrum, illumination polarization, etc., of one or more light units may be controlled by the controller 105 and/or by the respective light unit 106. Each light unit 106 and/or groups thereof may include a network address and/or other identifying information such that transmissions from/to the light unit 106 may be suitably directed. The light unit identifying information may further include a geophysical location.

Figure 2:
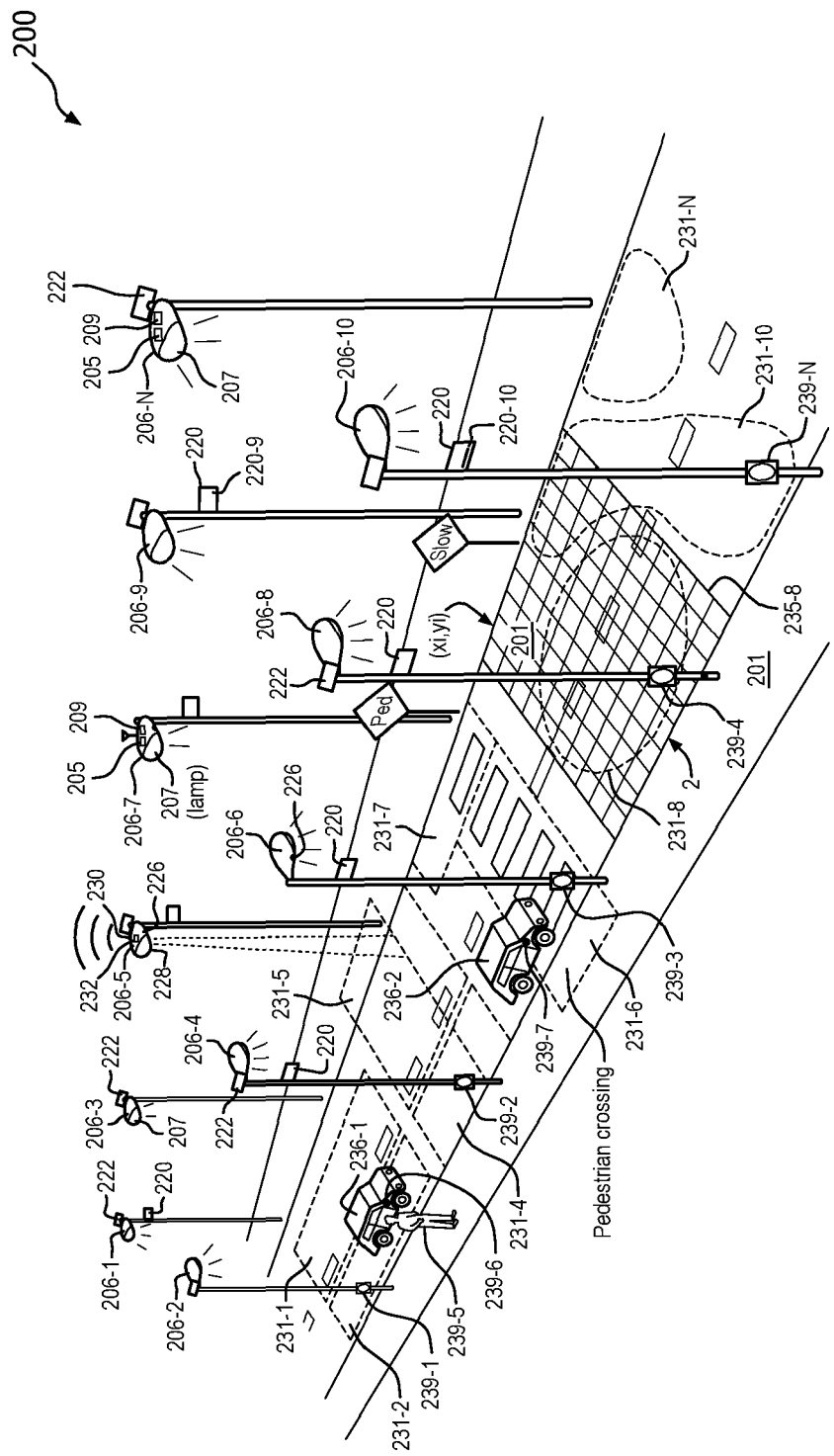
FIG. 2 is perspective view of a lighting system in accordance with embodiments of the present system.

FIG. 2 is perspective view of a lighting system 200 (a portion of outdoor lighting network (OLN) 100) in accordance with embodiments of the present system. The lighting system 200 may be similar to the outdoor lighting network (OLN) 100 and may include a plurality of light units 206-1 through 206-N which may illuminate a surface 201 such as a street, sidewalk, park, parking lot, etc., with a controllable illumination pattern 231-1 through 231-N. One or more of the light units 206 may include one or more of an illumination source 207, battery storage 220, a controller 205, a Tx/Rx portion 209, and an alternate energy source 222, e.g. solar cell. The illumination source 207 may include one or more lamps such as LEDs, gas lamps, fluorescent lamps, incandescent lamps, etc., which may provide illumination under the control of the controller 205. The Tx/Rx portion 209 may transmit and/or receive information such as, data (e.g. advertising, general information, selected information, etc.), sensor information, lighting setting information, power setting information, etc., to and/or from the CMS 102, other light units 206, a power portion, sensors, user interface apparatus 122, or input/output devices 239-1 through 239-N, etc. Further, one or more of the light units 206 may include input/output devices 239. The input/output devices 239 of FIG. 2 or user interface apparatus 122-1 of FIG. 1 may be coupled to light units 206 or mobile user devices 239. As further shown in FIG. 2, input/output devices 239 may be mounted on a light unit 206 or vehicle 236-1 through 235-2.

Input/output devices 239 may be any interface output device such as speakers, colored indicator lights (e.g. red/yellow/green), display panels with keyboards or touch panels etc. wherein information may be input or output, for example by users, to the lighting system 200. In particular, the display panels with keyboards or touch panels may be used to input a password or user identifier to obtain requested (personalized) information (e.g. directional path indicators, etc.). The input/output devices 239 may also be uses to control one or more lighting system 200 functionality, depending on the user's appropriate level of access. Conventional access protocols may be used. Further, one or more of the light units 206 may include motion sensors 226 and light sensors 228. Further sensors may be any sensor as further described herein, such as an infrared (IR)/air (ambient) temperature sensors, etc. (hereinafter collectively "sensors 226").

As described above, the motion sensors 228 are used to anticipate lighting needs of the OLN. For example, the OLN anticipates the direction traveled by a vehicles 236 or users 237, which may include user interface apparatus 122 or input/output devices 239. Motion sensors 228 along a road detect the direction and speed those vehicles 236 are traveling. Light sensor 226 detects any change the ambient light level or color temperature. Then the CMS 102 can change the lighting strategy (e.g. dimming) of the next few neighboring light units 206 in the direction of the traveling vehicle(s) or user(s) (while leaving other light units 206 unchanged). In particular, the system observes any change in behavior of the vehicles 236 or users 239 (e.g. changes in speed or light use, such as headlight low-to-high beam use, or flashlight use, etc.). From any change, e.g. decrease in speed and/or increase in ambient light level detected by sensors 226, a new lighting strategy is determined according to the constantly updated estimated position/ambient light level of the vehicle/user, thereby factoring in the comfort level or safety of the driver/user. When there is only a single vehicle passing by in a particular time interval t, the system may decide to further reduce the light level as the risk of collisions with other cars is low. Thus, the system monitors if the behavior of the vehicle/user changes after executing the dimming strategy.

At intersections, light units 206 in any viable direction for travel are affected when the vehicle has begun travel along a particular route from that intersection, at which time the light units 206 ahead of that vehicle light up while the other routes dim or are turned off. Similarly, in a parking lot or a park, motion sensors 228 can detect the direction that a person is traveling and light units 206 in the direction that the vehicle is moving, or create some other illumination pattern that promotes safety, alertness, path lighting directions or other desirable goals based on its speed and ambient light level.

Moreover, with respect to an illumination pattern 231-8, the CMS may control the light units 206 to adjust illumination intensity for one or more determined areas or portions of one or more areas of an illumination pattern (e.g., see, darker shading which indicates brighter illumination than lighter shading in FIG. 2) in accordance with the lighting setting information. Thus, for example, assuming a light unit 206 such as the light unit 206-8 may illuminate an area 235-8 which may correspond with, for example, an illuminated matrix $(x_i, y_j)$, the CMS may control the illumination source 206-8 to adjust an illumination pattern to illuminate an area such as the whole matrix $(x_i, y_j)$ or a portion of the matrix such as an area defined by an illumination pattern 231-8. Moreover, within an illumination pattern such as the illumination pattern 231-8 the controller may control the light unit 206-N to control an illumination intensity (e.g., in lumens/area$^2$) such that portions of the pattern 231-8 have more or less illumination as illustrated by the above mentioned lighter and/or darker shading shown within the illumination pattern 231-8. Thus, an illumination pattern, color temperature and/or an illumination intensity (e.g., within the pattern or within the whole area illuminated by a corresponding light unit 206-N) may be controlled by the system.

Further, the controller 205 may receive/transmit (e.g., in response to requests or periodically) sensor information which may be analyzed (e.g., using image analysis of image information received in the sensor information) either in the light unit 206-N or a CMS, and determine whether a lighting pattern is sufficient and/or to adjust a lighting pattern if it is determined that a current lighting pattern does not meet current lighting requirements (e.g., is insufficient).

The controller 205 and/or a CMS may then form and/or update a lighting setting/reaction information database in a memory of the system 200 in accordance with information generated and/or received by the system such as the current lighting setting information, sensor information, reactions, other information, and/or forecasts, etc. for later use. Thus, lighting settings for certain patterns may be modified by the system as described herein.

Figure 3:
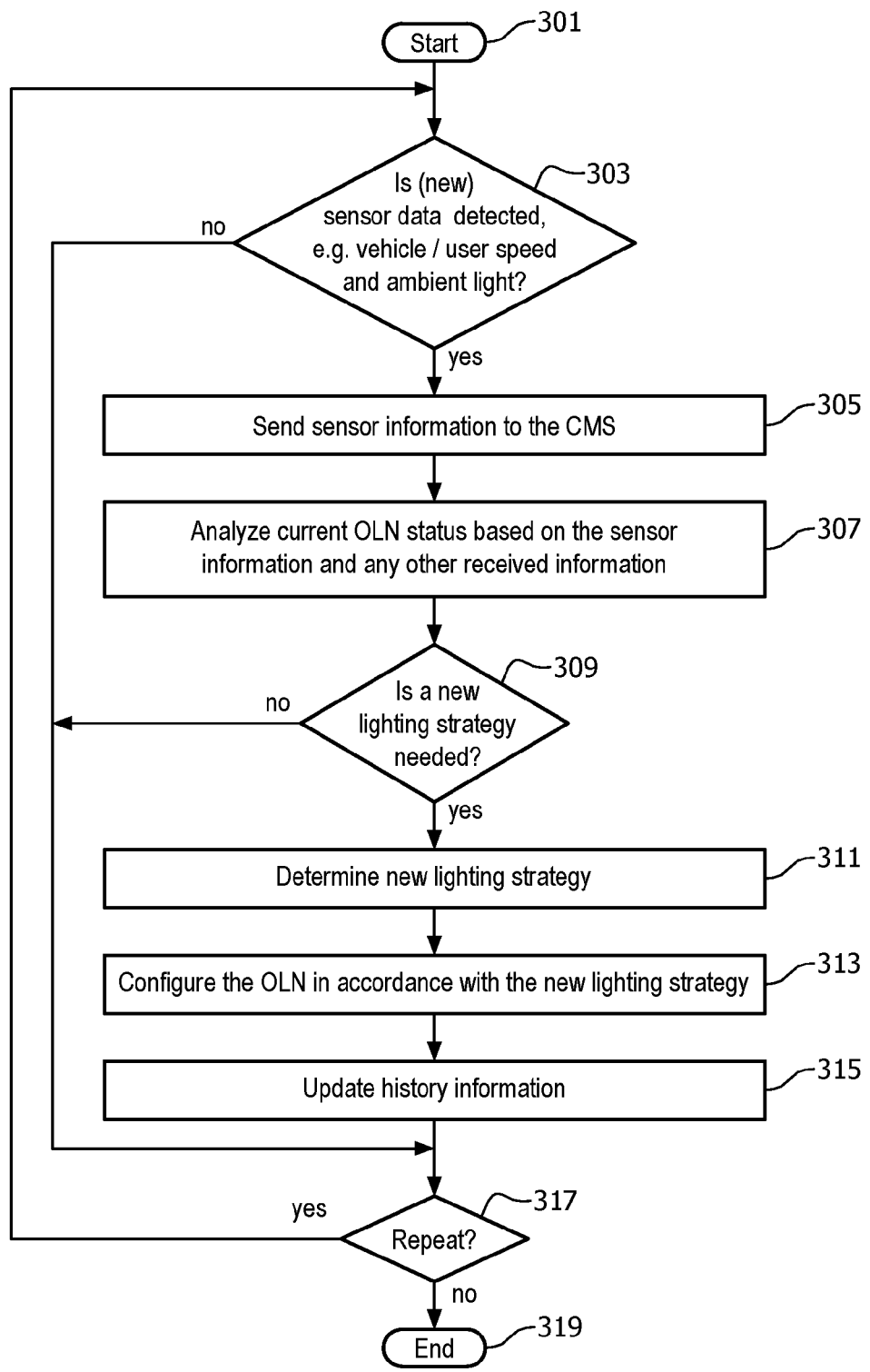
FIG. 3 shows a flow diagram that illustrates a process in accordance with embodiments of the present system.

FIG. 3 shows a flow diagram that illustrates a process 300 in accordance with embodiments of the present system. The process 400 may be performed by a system as shown in FIGS. 1 & 2. The process 300 may include one of more of the following steps. Further, one or more of these steps may be combined and/or separated into sub-steps, if desired. In operation, the process may start during step 301 and then proceed to step 303.

During step 303, the process determines if sensor 226 detect new sensor data, e.g. vehicle/user speed and ambient light. If this determination is Yes, then the process proceeds to step 405.

During step 305 of the process, some or all sensor information from sensors 226 from each light unit 206, which may include information related to the status of conditions in the vicinity of one or more luminaires in accordance with embodiments of the present system, sent to CMS 102. Furthermore the process may obtain and send other useful or available information from Resources 112, such conditions may include: weather conditions, traffic conditions, hazardous or dangers conditions, monitoring/tracking of objects, the Internet, historical data, etc. After obtaining the information, the process may continue to step 307.

During step 307, the process analyzes the current OLN status. For example, the process may analyze the speed and ambient light information and or changes thereto to determine if a new lighting strategy is needed for a detected vehicle/user in accordance with embodiments of the present system.

In step 309, if a new lighting strategy is not needed, the process proceeds to step 315, If yes, the process proceeds to step 311, and a new lighting strategy is determine based on the sensor information and any information from Resources 112 may be used to further refine a lighting strategy. After completing step 311, the process continues to step 313, to configure the OLN in accordance with the new lighting strategy.

During step 311, the present system may determine a lighting strategy in accordance with the embodiments of the present invention, such as determine the behavior of a vehicle/user in response in to the current status information or take other actions, such as provide an alerting signal to users/vehicles in the area or send information/messages to one or more user interface apparatus 122 or input/output devices 239, or provide a coordinated lighting setting response using two or more light units 206, sensors 226, input/output devices 239-1/user interface apparatus 122-1. The lighting strategy may, for example, control the profile, illumination pattern(s), intensities, spectrum(s), polarization(s), frequencies (e.g., for flashing or continuous lighting, etc.), etc., of illumination provided by one or more of the one or more light units.

During step 315, the present system may form and/or update history information (e.g., statistical information) of a memory of the present system in accordance with the sensor or received information. For example, an indicator for behavior change (e.g. yes/no, no/reduce speed/increase lights/both), dimming schedule (list of pairs with <percentage, distance ahead of car>), original vehicle speed, original ambient level, and other parameters, e.g. road type, traffic volume, weather status, the sensor information, day, date, time, user travel patterns, etc. which information may be used at a later time. After completing step 315, the process may continue to step 317.

During step 317, the present system may determine whether to repeat one or more steps of the process. Accordingly, if it is determined to repeat one or more steps of the process, the process may continue to step 303 (or to another step which is desired to be repeated). Conversely, if it is determined not to repeat one or more steps of the process, the process may continue to step 319, where it ends. The process may be repeated at certain periodic and/or non-periodic time intervals. By repeating the process, history information may be accessed and used to determine, for example, rate of change of the sensor information. This information may be used to determine and/or tune appropriate responses in lighting system 200 to various situations and events.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A light management system for an outdoor lighting network system, comprising:
    a plurality of outdoor light units wherein at least one light unit includes at least one sensor type;
    a central management system in communication with light units, said central management system sends control commands to one or more of said outdoor light units, in response to received outdoor light unit status/sensor information from one or more of said outdoor light units and implement a lighting strategy relating to the lighting characteristics of the plurality of outdoor light units;
    wherein the central management system uses the light unit status/sensor information to determine a current user's behavior, wherein the central management system stores history information relating to user behavior, relating to at least one of the plurality of outdoor light units, that includes at least two or more of dimming schedule, user speed, ambient light level, traffic volume and weather status, based on date and time, and determining the current user's behavior based on a deviation to the stored history information, wherein determining the current user's behavior includes determining a current user deviation in user-controlled light level to the stored history information, and determine whether to modify the lighting strategy.

2. The system of claim 1, wherein the central management systems further determines a user's behavior by determining a change in the user's speed.

3. The system of claim 1, wherein the central management systems further determines a user's behavior by determining a user's driving patterns.

4. The system of claim 3, wherein a sensor sends sensor data regarding a user driving pattern to the central management system, wherein the central management system determines the user's driving pattern by analyzing whether the user is in compliance with traffic lights, road signs or warnings, and if the user is weaving/swerving, getting off the road, and measuring time in a passing/overtaking road lane.

5. The system of claim 1, wherein the central management system reconfigures one or more of the lights units based on the modified lighting strategy.

6. The system of claim 1, wherein the modified lighting strategy includes modifying the light characteristics of subsequent light units along the estimated position or trajectory of the user.

7. The system of claim 1, further including at least one user input/output device in communication with at one or more of said outdoor light units, wherein the central management system provides information to the at least one user input/output device.

8. The system of claim 1, further including a resource server in communication with said central management system, wherein the central management system uses resources from the resource server to further modify the lighting strategy and/or reconfigure one or more of the lights units.

9. A method of light management for outdoor lighting network system, the outdoor lighting network having a plurality of outdoor light units wherein at least one light unit includes at least one sensor type, and a central management system in communication with the outdoor light units, the method comprising the steps of:
    receiving, in the central management system, status/sensor information from the at least one sensor type;
    storing, in the central management system using the status/sensor information, history information relating to user behavior, relating at least one of the plurality of outdoor light units, that includes at least two or more of dimming schedule, user speed, ambient light level, traffic volume and weather status, based on date and time;
    determining a current user's behavior based on a deviation to the stored history information, wherein determining the current user's behavior includes determining a current user deviation in user-controlled light level to the stored history information;
    determining whether to modify the lighting strategy based on the user behavior.

10. The method of claim 9, wherein the determining a user's behavior further includes determining a change in the user's speed.

11. The method of claim 9, determining a user's behavior further includes determining a user's driving patterns.

12. The method of claim 11, wherein determining a user's driving patterns includes analyzing whether the user is in compliance with traffic lights, road signs or warnings, and if the user is weaving/swerving, getting off the road, and measuring time in a passing/overtaking road lane.

13. The method of claim 9, further including the step of reconfiguring one or more of the lights units.

14. The method of claim 11, wherein modifying the lighting strategy includes modifying the light characteristics of subsequent light units along the estimated position or trajectory of the user.

15. The method of claim 11, further including at least one user input/output device in communication with at one or more of said outdoor light units, and the step of, the central management system, providing information to the at least one user input/output device.

16. The system of claim 11, wherein the step of modifying the lighting strategy and/or reconfigure one or more of the lights units includes receiving information from a resource server in communication with said central management system.

* * * * *